United States Patent
Kahol et al.

(10) Patent No.: US 9,118,717 B2
(45) Date of Patent: Aug. 25, 2015

(54) DELAYED NETWORK PROTOCOL PROXY FOR PACKET INSPECTION IN A NETWORK

(75) Inventors: Anurag Kahol, Fremont, CA (US);
Sumandra Majee, San Jose, CA (US);
Alex Waterman, Los Gatos, CA (US);
Paul Mathison, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 2098 days.

(21) Appl. No.: 11/061,248

(22) Filed: Feb. 18, 2005

(65) Prior Publication Data
US 2006/0190612 A1    Aug. 24, 2006

(51) Int. Cl.
G06F 15/16    (2006.01)
H04L 29/06    (2006.01)
G06F 15/177   (2006.01)
H04L 29/08    (2006.01)

(52) U.S. Cl.
CPC ............. *H04L 69/16* (2013.01); *H04L 69/163* (2013.01); *H04L 69/24* (2013.01); *H04L 67/2819* (2013.01)

(58) Field of Classification Search
USPC ........................................................ 709/228
See application file for complete search history.

(56) References Cited

U.S. PATENT DOCUMENTS

| | | | |
|---|---|---|---|
| 5,937,169 A | 8/1999 | Connery et al. | |
| 5,941,988 A | 8/1999 | Bhagwat et al. | |
| 5,961,605 A | 10/1999 | Deng et al. | |
| 5,978,849 A * | 11/1999 | Khanna | 709/227 |
| 6,006,268 A | 12/1999 | Coile et al. | |
| 6,098,093 A | 8/2000 | Bayeh et al. | |
| 6,173,322 B1 | 1/2001 | Hu | |
| 6,298,380 B1 | 10/2001 | Coile et al. | |
| 6,338,089 B1 | 1/2002 | Quinlan | |
| 6,389,462 B1 * | 5/2002 | Cohen et al. | 709/218 |
| 6,411,986 B1 | 6/2002 | Susai et al. | |
| 6,598,081 B1 * | 7/2003 | Coile et al. | 709/227 |
| 6,615,265 B1 | 9/2003 | Leymann et al. | |
| 6,725,281 B1 | 4/2004 | Zintel et al. | |
| 6,775,692 B1 | 8/2004 | Albert et al. | |

(Continued)

OTHER PUBLICATIONS

Berners, T et al. "Hypertext Transfer Protocol—HTTP/1.0", HTTP /1.0, May 1996, http://www.ietf.org/rfc/rfc1945.txt, pp. 1-60. (referenced located on CD ROM).

Egevang, K. et al., "The IP Network Address Translator (NAT)", Network Address Translator, May 1994, http://www.ietf.org/rfc/rfc1631.txt, pp. 1-10. (referenced located on CD ROM).

(Continued)

*Primary Examiner* — Joseph Greene
(74) *Attorney, Agent, or Firm* — Hickman Palermo Becker Bingham LLP (57) ABSTRACT

An intermediary device, which behaves as a proxy for two entities after the entities have established a connection between themselves, is disclosed, as is a method that may be performed by such a device. The intermediary device can inspect a complete message, whose parts may be spread among multiple separate packets, without engaging in handshake phases with the message's origin or destination. As a first entity negotiates connection parameters with a second entity, the intermediary device stores the connection parameters as the parameters flow through the intermediary device. After the two entities have established an original connection, the intermediary device uses the intercepted parameters to form two separate connections in the place of the original connection: one between the intermediary device and the first entity, and another between the intermediary device and the second entity. To the entities, the newly formed connections appear to be same as the original connection.

20 Claims, 5 Drawing Sheets

(56) References Cited

U.S. PATENT DOCUMENTS

| | | |
|---|---|---|
| 6,779,004 B1 | 8/2004 | Zintel |
| 6,801,927 B1 | 10/2004 | Smith et al. |
| 6,857,009 B1 | 2/2005 | Ferreria et al. |
| 6,892,230 B1 | 5/2005 | Gu et al. |
| 6,968,389 B1 | 11/2005 | Menditto et al. |
| 6,975,647 B2 | 12/2005 | Neale et al. |
| 7,085,814 B1 | 8/2006 | Gandhi et al. |
| 7,337,226 B2 | 2/2008 | Saha et al. |
| 7,406,709 B2 * | 7/2008 | Maher et al. .................... 726/12 |
| 2002/0085549 A1 | 7/2002 | Reza et al. |
| 2002/0091738 A1 | 7/2002 | Rohrabaugh et al. |
| 2002/0112152 A1 | 8/2002 | VanHeyningen et al. |
| 2002/0143954 A1* | 10/2002 | Aiken et al. .................... 709/227 |
| 2002/0188743 A1 | 12/2002 | Schaffrath |
| 2002/0199114 A1* | 12/2002 | Schwartz ....................... 713/201 |
| 2003/0028666 A1* | 2/2003 | Hanner ........................... 709/238 |
| 2003/0041095 A1 | 2/2003 | Konda et al. |
| 2003/0120811 A1* | 6/2003 | Hanson et al. ................. 709/245 |
| 2003/0123481 A1* | 7/2003 | Neale et al. .................... 370/466 |
| 2003/0172169 A1* | 9/2003 | Cheng ............................ 709/230 |
| 2004/0006625 A1 | 1/2004 | Saha et al. |
| 2004/0088413 A1 | 5/2004 | Bhogi et al. |
| 2004/0205644 A1 | 10/2004 | Shaughnessy et al. |
| 2005/0015356 A1 | 1/2005 | Ireland et al. |
| 2005/0060372 A1 | 3/2005 | DeBettencourt et al. |
| 2005/0076126 A1 | 4/2005 | Knight et al. |
| 2005/0120117 A1 | 6/2005 | Burckart et al. |
| 2005/0149940 A1 | 7/2005 | Calinescu et al. |
| 2005/0172029 A1 | 8/2005 | Burke et al. |
| 2005/0198261 A1* | 9/2005 | Durvasula et al. ............ 709/224 |
| 2006/0031520 A1 | 2/2006 | Bedekar et al. |
| 2006/0031571 A1 | 2/2006 | Banerjee et al. |
| 2006/0168224 A1 | 7/2006 | Midgley |
| 2006/0282662 A1 | 12/2006 | Whitcomb |

OTHER PUBLICATIONS

Fielding, R. et al., "Hypertext Transfer Protocol—HTPP/1.1," The Internet Society, Jun. 1999, http://www.ietf.org/rfc/rfc2616.txt, pp. 1-176. (referenced located on CD ROM).

Fielding, R. et al. "Hypertext Transfer Protocol—HTTP/1.1", HTTP/1.1, Jan. 1997, http://www.ietf.org/rfc/rfc2068.txt, pp. 1-162. (referenced located on CD ROM).

Information Sciences Institute, "DOD Standard Internet Protocol", Internet Protocol, Jan. 1980, http://www.ietf.org/rfc/rfc0760.txt, pp. 1-42. (referenced located on CD ROM).

Information Sciences Institute, "Transmission Control Protocol DARPA Internet Program Protocol Specification", Transmission Control Protocol, Sep. 1981, http://www.ietf.org/rfc/rfc0793.txt, pp. 1-85. (referenced located on CD ROM).

Information Sciences Institute, DOD Standard Transmission Control Protocol, Jan. 1980, http://www.ietf.org/rfc/rfc0761.txt, pp. 1-84. (referenced located on CD ROM).

Khare, R. et al. "Upgrading to TLS Within HTTP/1.1", HTTP Upgrade to TLS, May 2002, http://www.ietf.org/rfc/rfc2817.txt, pp. 1-13. (reference located on CD ROM.

Postel, J., "Internet Control Message Protocol", Apr. 1981, http://www.ietf.org/rfc/rfc0777.txt, pp. 1-14. (referenced located on CD ROM).

Postel, J., "Internet Control Message Protocol DARPA Internet Program Protocol Specification", Sep. 1981, http://www.ietf.org/rfc/rfc0777.txt, pp. 1-21. (referenced located on CD ROM).

Ramakrishnan, K. et al., "The Addition of Explicit Congestion Notification (ECN) to IP Status of this Memo)", The Internet Society, Sep. 2001, http://www.ietf.org/rfc/rfc3168.txt, pp. 1-63. (referenced located on CD ROM).

Srisuresh, P. et al., "Traditional IP Network Address Translator (Translator NAT)", Traditional NAT, Jan. 2001, http://www.ietf.org/rfc/rfc3022.txt, pp. 1-16. (referenced located on CD ROM).

* cited by examiner

DELAYED NETWORK PROTOCOL PROXY FOR PACKET INSPECTION IN A NETWORK

RELATED APPLICATIONS

This application is related to U.S. patent application Ser. No. 10/925,396, entitled "REPROXYING AN UNPROXIED CONNECTION," filed by Patrick Darrell Tate, Alexander S. Waterman, Martin David Grimm, and Anurag Kahol on Aug. 24, 2004, the entire contents of which are incorporated by reference for all purposes as though fully disclosed herein.

FIELD OF THE INVENTION

The present invention generally relates to proxy devices in computer networks. The invention relates more specifically to a method and apparatus for enabling an intermediary device to start behaving as a proxy device relative to two communicating entities after a connection already has been established between the two communicating entities.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

It is commonplace nowadays for two entities, such as a client application and a server application, to communicate with each other via a network or combination of networks such as the Internet. Often, the entities communicate with each other via one or more intermediary devices such as routers. The entities may communicate by sending data packets towards each other through one or more intervening networks. Routers, which are positioned between the entities, may intercept the data packets and forward the data packets towards the data packets' destinations. The entities typically remain unaware of the path taken by data packets through intervening networks and intermediary devices.

Two entities communicating with each other through one or more intervening networks typically do so using a suite of protocols. For example, the entities may use the Internet Protocol (IP), Transport Control Protocol (TCP), and Hypertext Transfer Protocol (HTTP) in combination to communicate with each other. Some of these protocols are connection-oriented. Connection-oriented protocols typically require connection-related parameters to be negotiated between entities to the connection before the connection is "opened." Data can be sent through the connection only after these parameters have been negotiated and the connection has been opened.

Parameter negotiation is often achieved through a "handshake" phase of a protocol. A handshake phase usually requires a significant amount of communication between the entities. When encryption is involved, a handshake phase also may require a significant amount of processing by the entities. Due to this communication and processing overhead, the transmission of substantive content between the entities may be delayed significantly.

Intermediary devices sometimes include devices that take a relatively active role in the communications between two entities. For example, instead of merely forwarding intercepted data packets toward the data packets' destination, an intermediary device such as a firewall device might perform operations that require the accumulation of multiple data packets at the intermediary device prior to the sending of any of those data packets toward the destination. Due to some TCP characteristics, which are provided to enable TCP packet senders to verify that their TCP packets reach intended destinations, accumulating TCP packets at an intermediary device is more complicated than it might initially seem.

According to TCP, whenever a receiving entity receives a TCP packet, the receiving entity is supposed to respond to the sending entity, from which the TCP packet originated, with an acknowledgement that identifies the TCP packet. If the sending entity receives the acknowledgement, then the sending entity can rest assured that the receiving entity actually received the corresponding TCP packet. Alternatively, if the sending entity does not receive the acknowledgement within a reasonable period of time, then the sending entity may assume that the receiving entity did not receive the corresponding TCP packet, and the sending entity may re-send the corresponding TCP packet.

Under some circumstances, the sending entity will not send additional TCP packets until the sending entity has received acknowledgements for TCP packets that the sending entity has already sent. If a firewall device has been intercepting and accumulating TCP packets instead of forwarding the TCP packets to the intended receiving entity, then the intended receiving entity will not have been returning any acknowledgements to the sending entity. Due to the missing acknowledgments, the sending entity may re-send TCP packets that the firewall device has already accumulated instead of sending additional TCP packets that the firewall device needs to accumulate in order to determine whether to forward any of the accumulated TCP packets toward the intended receiving entity. The sending entity and the firewall device each end up waiting for the other to perform an action that the other will never perform.

This situation could be avoided by allowing the firewall device to behave as a "proxy" device. As a proxy device, the firewall device would send acknowledgements to the sending entity for each TCP packet that the firewall device received. The sending entity would receive the acknowledgements and continue to send TCP packets toward the firewall device. However, this would also necessitate the shifting, from the sending entity to the firewall device, of the burden of ensuring that the TCP packets reached the intended receiving entity; having received an acknowledgement for a particular TCP packet, the sending device will not re-send the particular TCP packet thereafter, even if the particular TCP packet never actually reaches the intended receiving entity. Thus, as a proxy device, the firewall device would need to receive acknowledgements from the receiving entity, and re-send any TCP packet for which no acknowledgement was received within a reasonable period of time.

To enable the firewall device to behave as a proxy device in this manner, two separate TCP connections need to be established: one between the sending entity and the proxy device, and another between the proxy device and the receiving entity. As is discussed above, establishing a TCP connection between two entities involves a time-consuming handshake phase. Thus, to enable the firewall device to behave as a proxy device, the sending entity engages in a first handshake phase with the firewall device, and then the firewall device engages in a second handshake phase with the receiving device. Because the negotiation of the second handshake phase depends on the negotiation of the first handshake phase, the two handshake phases cannot be performed concurrently. Until both handshake phases have been completed, TCP packets cannot flow between the sending entity and the receiving entity. The communication delay (latency) resulting from having to wait for two separate handshake phases to complete is both significant and undesirable.

This is not the only detrimental effect that may occur as a result of the proxy scheme discussed above. As is discussed above, a TCP connection between a sending entity and a proxy device may be opened before the proxy device attempts to open a TCP connection with the intended receiving entity. However, the receiving entity might not be available; the receiving entity might not respond to the proxy device's attempts to open a TCP connection with the receiving entity. Nevertheless, because the sending entity already successfully established a TCP connection between the sending entity and the proxy device, the sending entity may be left with the mistaken impression that a complete communication path to the receiving entity is available, when, in reality, the path ends at the proxy device. If the sending entity proceeds under this mistaken impression, the outcome may be unexpected and undesirable.

A connection technique that allows an intermediary device to accumulate multiple separate TCP packets before sending the TCP packets toward a destination, and that additionally avoids the delays produced as a result of a series of handshake phases, is needed.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for enabling an intermediary device to start behaving as a proxy device relative to two communicating entities after a connection already has been established between the two communicating entities is described. Certain embodiments of the method allow an intermediary device to inspect a complete message, whose parts may be spread among the payload portions of multiple separate TCP packets, without engaging in time-consuming handshake phases with the message's origin and the message's destination.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
  1.0 General Overview
  2.0 Structural and Functional Overview
     2.1 System
     2.2 Client-Server Three Way Handshake
     2.3 "Delayed" Proxying Technique
  3.0 Implementation Examples
  4.0 Implementation Mechanisms—Hardware Overview
  5.0 Extensions and Alternatives 1.0 General Overview The needs identified in the foregoing Background, and other needs and objects that will become apparent for the following description, are achieved in the present invention. According to one embodiment of the invention, as a first entity negotiates connection parameters with a second entity during a handshake phase, an intermediary device stores the connection parameters as the parameters flow through the intermediary device. After the two entities have established an original connection between each other based on the connection parameters, the intermediary device uses the intercepted parameters to form two separate connections in the place of the original connection: one connection between the intermediary device and the first entity, and another connection between the intermediary device and the second entity. All of this may be accomplished without the intermediary device separately negotiating connection parameters with either entity. To the entities, the newly formed connections appear to be same as the original connection. Thus, the entities do not need to be aware of the actions performed by the intermediary device.

Having formed the separate connections, each with an endpoint at the intermediary device, the intermediary device can then behave as a proxy device relative to the entities. As a proxy device, the device may send acknowledgements to a sending entity for each TCP packet that the device intercepts from the sending entity. Also, as a proxy device, the device may receive acknowledgements from a receiving entity, and re-send any TCP packet for which no acknowledgement was received within a reasonable period of time.

The proxy device may take a relatively active role in the communications between two entities. For example, instead of merely forwarding intercepted data packets toward the data packets' destination, the proxy device might perform "deep" packet inspection by examining the contents of the payload portions of data packets. Based on the contents, the proxy device might perform one or more specified actions. For example, a firewall device that sits at the boundary of an organization's private network might examine the contents of all TCP packets that the firewall device intercepts. The firewall device may refuse to forward, into the organization's network, any TCP packet that belongs to a TCP packet sequence that contains content that matches a specified forbidden pattern.

By selectively refusing to forward such TCP packets, the firewall device can prevent viruses from infiltrating the organization's network. Additionally, by selectively refusing to forward such TCP packets, the firewall device can prevent the organization's network bandwidth from being used for unauthorized purposes. For example, if a organization doesn't want its employees to be able to use a particular peer-to-peer, networking application that would send messages to and receive messages from beyond the organization's network, the organization can configure the firewall device to detect a pattern that is known to occur only in messages that the application sends and receives, and to "drop" or modify all TCP packets that belong to any TCP packet sequence that contains the pattern.

In other aspects, the invention encompasses a computer apparatus and a computer-readable medium configured to carry out the foregoing steps.

2.0 Structural and Functional Overview 2.1 System

Figure 1:
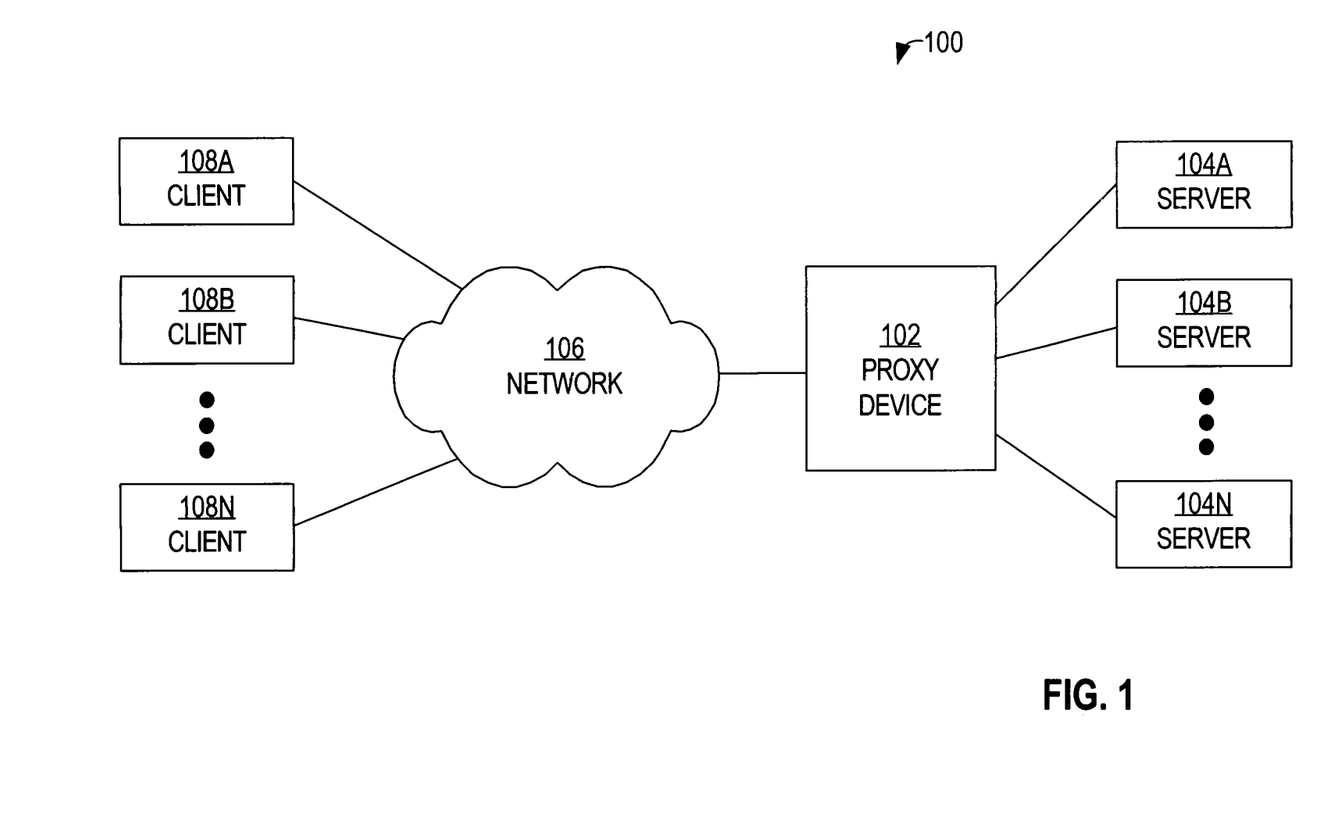
FIG. 1 is a block diagram that illustrates an overview of one embodiment of a system in which a proxy device forms two connections between entities based on connection parameters that the proxy device observes as the entities negotiate the connection parameters with each other.

FIG. 1 is a block diagram that illustrates an overview of one embodiment of a system 100 in which a proxy device 102 forms two connections between entities based on connection parameters that proxy device 102 observes as the entities negotiate the connection parameters with each other. Proxy device 102 may be, for example, a firewall device or an intrusion detection system (IDS) device. Thus, the term "proxy" is used broadly, and proxy device 102 may comprise a network node that does not perform proxy functions in other contexts.

Proxy device 102 is coupled communicatively with servers 104A-N. Each of servers 104A-N may be a separate computer. Alternatively, each of servers 104A-N may be a separate process executing on the same computer or on separate computers. For example, each of servers 104A-N may be a separate web server process.

Proxy device 102 also is coupled communicatively with a network 106. Network 106 is a computer network, such as, for example, a local area network (LAN), wide area network (WAN), or internetwork such as the Internet. Clients 108A-N also are coupled communicatively with network 106. Each of clients 108A-N may be a separate computer. Alternatively, each of clients 108A-N may be a separate process executing on the same computer or on separate computers. For example, each of clients 108A-N may be a separate web browser process.

Although the interactions between clients 108A-N and servers 104A-N are discussed below in the context of client-server relationships, embodiments of the invention are also applicable to similar interactions that occur between peer nodes that are not engaged in a client-server relationship. Furthermore, although TCP is discussed below as a network protocol carrier of communications between clients 108A-N and servers 104A-N, embodiments of the invention alternatively may employ other network protocols that involve the negotiation or exchange of protocol-related parameters between entities that are initiating communications with each other.

Initially, one of clients 108A-N opens a TCP connection with one of servers 104A-N. For example, during a handshake phase, client 108A may negotiate TCP connection parameters with server 104A. The connection parameters pass through proxy device 102 as the parameters are communicated between client 108A and server 104A. Both client 108A and server 104A may be unaware that the connection parameters are passing through proxy device 102; the network may be configured in such a manner that all communications between clients 108A-N and servers 104A-N pass through proxy device 102.

When proxy device 102 receives a parameter negotiation message from client 108A or server 104A, proxy device 102 forwards the message toward the message's indicated destination so that the handshake phase between client 108A and server 104A can be completed. However, before forwarding the message, proxy device 102 inspects the message to determine whether the message contains connection negotiation parameters. If proxy device 102 determines that the message contains connection negotiation parameters, then proxy device 102 locally stores one or more of the connection negotiation parameters. Proxy device 102 maps the stored parameters to the entities that are sending and receiving the parameters—in this example, client 108A and server 104A.

After client 108A and server 104A have completed the handshake phase, client 108A and server 104A can send TCP data packets to each other through the "original" TCP connection that they have opened based on the negotiated parameters. Such data packets are carried in conformance with the negotiated parameters. The data packets may carry portions of request messages and response messages, such as HTTP requests and responses.

Any time after client 108A and server 104A have opened the original TCP connection, proxy device 102 may replace the original TCP connection with two separate TCP connections: one between client 108A and proxy device 102, and one between proxy device 102 and server 104A. Proxy device 102 may accomplish this without the awareness of client 108A and server 104A. In one embodiment, proxy device 102 replaces the original connection with the separate connections as soon as proxy device 102 observes a data packet passing through the original connection.

To replace the original TCP connection with two separate TCP connections, proxy device 102 constructs two new TCP endpoints at proxy device 102. Proxy device 102 constructs the TCP endpoints using the connection parameters that are locally stored and mapped to the entities to the original connection—in this example, client 108A and server 104A. For each TCP endpoint at the proxy device, the proxy device may store the appropriate connection parameters in a separate TCP control block (TCB). An existing endpoint at client 108A remains an endpoint in the new connection between client 108A and proxy device 102. Similarly, an existing endpoint at server 104A remains an endpoint in the new connection between server 104A and proxy device 102. The combination of the client-to-proxy device connection and the corresponding proxy device-to-server connection is called a "proxied" connection.

Because the existing endpoints at the entities to the original connection remain as endpoints in the new connections, the entities can continue sending and receiving data packets via the endpoints as though the endpoints were still endpoints in the original connection. Because the new endpoints are formed using the connection parameters already stored at proxy device 102, proxy device 102 does not need to engage in handshake phases with either of the entities.

Proxy device 102 maps the new endpoints to each other, so that when proxy device 102 receives a data packet through one of the new endpoints, proxy device 102 may forward the data packet through the other, corresponding new endpoint. Before forwarding data packets, proxy device 102 may accumulate multiple data packets, reorder and assemble the contents of payload portions of those data packets to form a message, and inspect the message. Based on the contents of the message, proxy device 102 may perform one or more specified actions prior to, or instead of, forwarding the accumulated data packets. For example, proxy device may drop the data packets or modify the contents of the data packets.

In one embodiment, proxy device 102 obtains some of the connection parameters from a data packet that proxy device 102 observes passing through the original connection. In such an embodiment, to create the new endpoints and connections, proxy device 102 uses the connection parameters obtained from the data packet in addition to the connection parameters that proxy device 102 observed and stored during the negotiations between the entities.

2.2 Client-Server Three-Way Handshake

Figure 2:
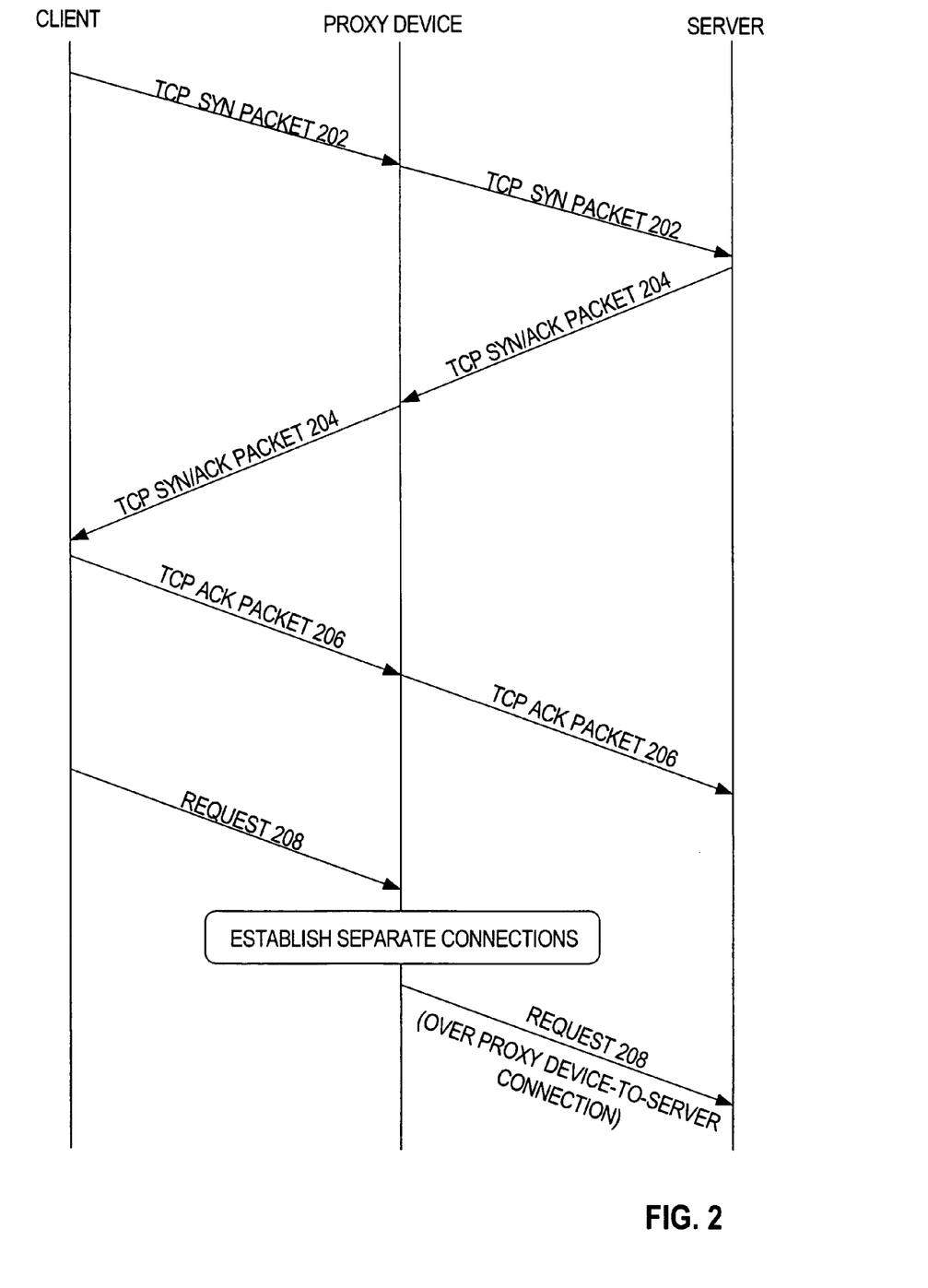
FIG. 2 is a diagram that illustrates a message communication sequence, according to one embodiment, by which an original client-to-server TCP connection is initially established.

An example of the process by which the original TCP connection is established between client 108A and server 104A is described below with reference to FIG. 2. FIG. 2 is a diagram that illustrates a message communication sequence, according to one embodiment, by which an original client-to-server TCP connection is initially established. The message communication sequence encompasses one performance of the "three-way handshake" protocol used in TCP—in this example, between a client and a server. All of the messages discussed below pass through a proxy device, where connection parameters contained within the messages are scrutinized and recorded.

The client sends a TCP SYN packet 202 toward a server. TCP SYN packet 202 indicates TCP parameters that the client proposes for use in the forthcoming TCP connection. The TCP parameters typically include, for example, a maximum segment size, a window scale factor, and flags that indicate whether time stamping and/or selective acknowledgment will be used. As with all other packets communicated between the client and the server, TCP SYN packet 202 passes through an intermediate proxy device. By inspecting TCP SYN packet 202 prior to forwarding TCP SYN packet 202 on to the client, the proxy device determines the values of the TCP connection parameters that the client is proposing to the server.

However, even if the server supports all of the TCP connection parameters that the client proposes in TCP SYN packet 202, the proxy device might support less than all of the proposed parameters. Therefore, in one embodiment, before forwarding TCP SYN packet 202 on toward the server, the proxy device modifies TCP SYN packet 202; for example, the proxy device may alter TCP SYN packet 202, so that TCP SYN packet 202 does not propose any TCP connection parameters that the proxy device cannot support. The proxy device may modify acknowledgement and sequence numbers and other information contained in TCP SYN packet 202 as needed to compensate for the alteration.

The server receives (potentially modified) TCP SYN packet 202 and responds with a TCP SYN/ACK packet 204. TCP SYN/ACK packet 204 indicates which of the client-proposed TCP parameters the server has accepted for use in the forthcoming TCP connection. As with all other packets communicated between the client and the server, TCP SYN/ACK packet 204 passes through an intermediate proxy device. By inspecting TCP SYN/ACK packet 204 prior to forwarding TCP SYN/ACK packet 204 on to the client, the proxy device determines the values of the TCP connection parameters by which the server has agreed to abide.

The client receives TCP SYN/ACK packet 204 and responds with a TCP ACK packet 206. With the negotiation between the client and the server concluded, both the client and the server create TCP endpoints based on the TCP parameters negotiated during the handshake phase described above. Thus, a full TCP connection is established between the client and the server.

The client sends a request 208 toward the server through the client's TCP endpoint. The proxy device detects request 208 as request 208 passes through the proxy device. In response to detecting request 208, the proxy device may replace the original TCP client-to-server TCP connection with the client-to-proxy device and proxy device-to-server TCP connections as described above.

The proxy device may modify request 208 before sending request 208 to the server. Whether or not request 208 is modified, the proxy device sends request 208 to the server through the proxy device's TCP endpoint involved in the proxy device-to-server connection (i.e., not the proxy device's TCP endpoint involved in the client-to-proxy device connection). The server receives request 208 at the server's TCP endpoint.

Together, the client-to-proxy device connection and the proxy device-to-server connection comprise a proxied connection.

As is discussed above, the proxy device may inspect TCP SYN/ACK packet 208 to obtain TCP connection parameters upon which the client and the server have agreed. In one embodiment, the proxy device stores the TCP connection parameters within separate connection block data structures as is described below.

According to one embodiment, in one such connection block data structure, proxy device 102 stores a tuple that indicates the client's IP address, the proxy device's IP address, a TCP protocol identifier, and an identifier of the client's TCP port used in the client-to-server connection, and an identifier of one of the proxy device's TCP ports. In the other such connection block data structure, proxy device 102 stores a tuple that indicates the proxy device's IP address, the server's IP address, a TCP protocol identifier, an identifier of one of the proxy device's TCP ports, and an identifier of the server's TCP port used in the client-to-server connection. Additionally, in each of the connection block data structures, proxy device 102 stores a separate sequence delta that indicates to what extent TCP sequence and acknowledgment numbers need to be adjusted when proxy device 102 "translates" these numbers to facilitate transparency between the client and server.

Additionally, in each connection block data structure, proxy device 102 stores construction information that, in conjunction with information that can be derived from any packet sent from the client to the server, will allow proxy device 102 to construct a TCP endpoint at the proxy device. In order to reduce the size of the connection block data structures, the construction information generally includes information that cannot be derived from a non-SYN, non-SYN/ACK packet and generally excludes information that can be derived from any packet sent from the client to the server.

According to one embodiment, the construction information includes the maximum segment size, the window scale factor, and flags that indicate whether time stamping and selective acknowledgment are to be used in the TCP connection. Storing such information that was negotiated during the handshake phase allows proxy device 102 to construct the TCP endpoints at proxy device 102 without engaging in any handshake phases.

In one embodiment, proxy device 102 constructs the TCP endpoints using a combination of (a) the information that was previously stored in the corresponding connection block data structures and (b) information that can be obtained from any data packet (including non-SYN, non-SYN/ACK packets) and that is not contained in the connection block data structures.

2.3 "Delayed" Proxying Technique

Figure 3:
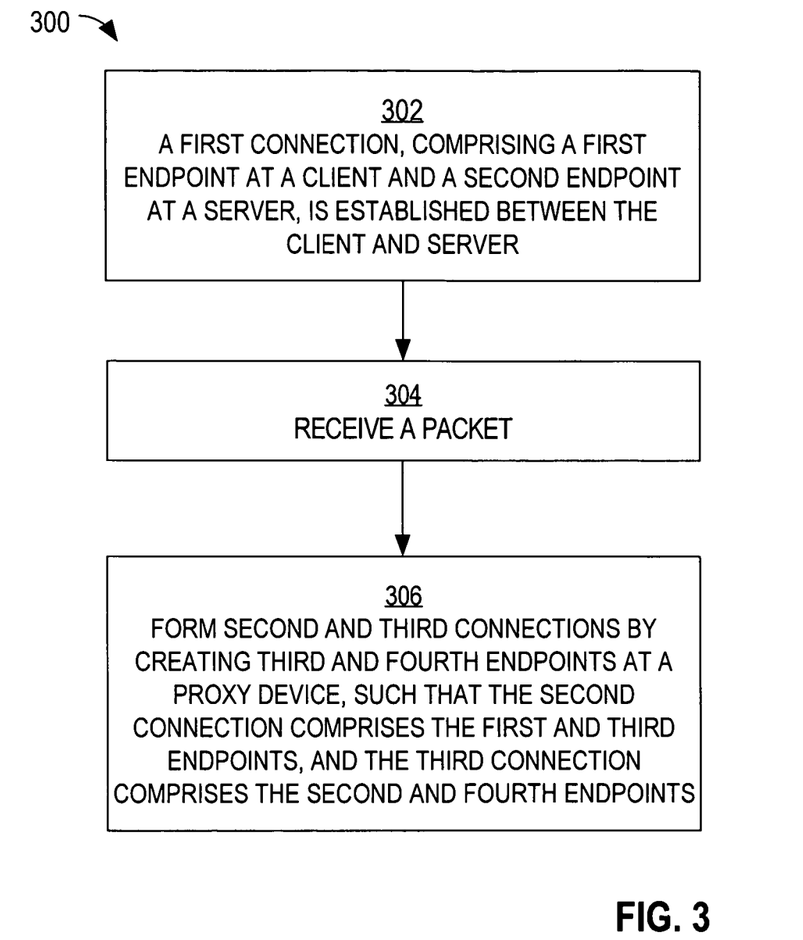
FIG. 3 depicts a flow diagram that illustrates an overview of one embodiment of a method for "proxying" a client-to-server connection.

FIG. 3 depicts a flow diagram 300 that illustrates an overview of one embodiment of a method for "proxying" a client-to-server connection. The proxying is "delayed" in the sense that the originally established client-to-server connection is not proxied at the time that the connection is established; the proxying is "delayed" until after the client-to-server connection has been established, but no particular amount of time delay is required. For example, such a method may be performed by proxy device 102. Other embodiments may contain operations additional to the operation depicted in flow diagram 300.

In block 302, a first connection is established between a client and a server. The first connection comprises a first endpoint at the client and a second endpoint at the server. For example, client 108A may establish an original full TCP connection with server 104A by engaging in a handshake phase as described above with reference to FIG. 2.

In block 304, after the establishment of the first and second endpoints, a packet is received. For example, proxy device 102 may receive a packet that client 108A sent through the TCP endpoint at client 108A.

In block 306, in response to the receipt of the packet, second and third connections are formed by creating a third endpoint and a fourth endpoint at the proxy device, such that the second connection comprises the first and third endpoints, and the second connection comprises the second and fourth endpoints. For example, in response to receiving the packet from client 108A over the first connection, proxy device 102 may "proxy" the connection by constructing two TCP endpoints at proxy device 102 based on (a) information contained in the packet, and (b) information contained in connection block data structures, as described above. The client-to-proxy device connection then comprises the client's original TCP endpoint and one of the proxy device's constructed TCP endpoints, and the proxy device-to-server connection then comprises the server's original TCP endpoint and the other of the proxy device's constructed TCP endpoints. Both connections are full TCP connections having two TCP endpoints each.

Although in one embodiment the proxy technique described above is performed in response to the receipt of a packet from a client or a server, in alternative embodiments, the proxy technique is performed in response to other events. For example, the proxy technique may be performed in response to the modification of a packet's payload. For another example, the proxy technique may be performed in response to the expiration of a timer.

3.0 Implementation Examples

Figure 4:
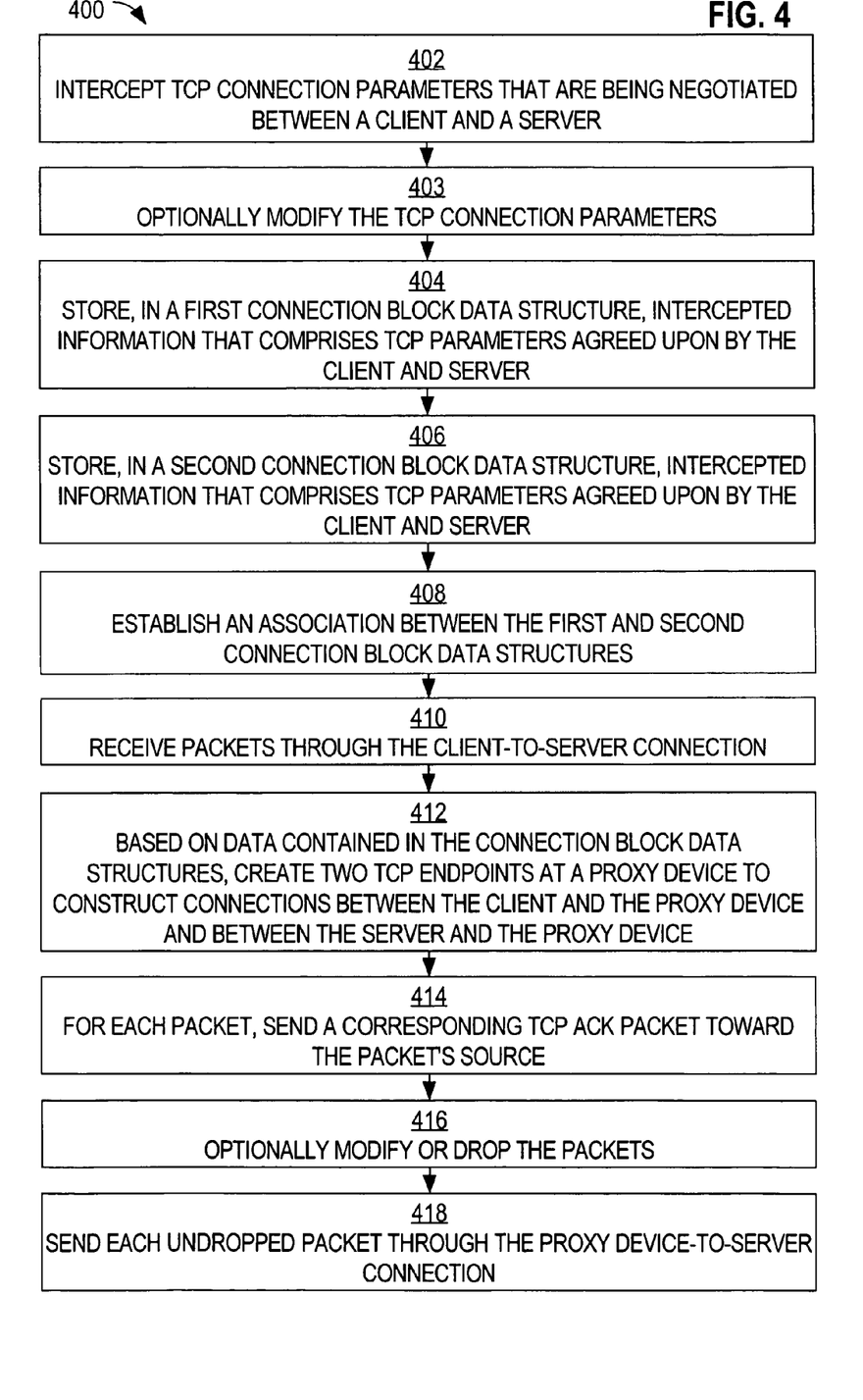
FIG. 4 depicts a flow diagram that illustrates one embodiment of a method for the "delayed" proxying of a connection.

FIG. 4 depicts a flow diagram 400 that illustrates one embodiment of a method for the "delayed" proxying of a connection. For example, such a method may be performed by proxy device 102. Other embodiments may contain operations additional to the operation depicted in flow diagram 400.

In block 402, TCP connection parameters, which are being negotiated between a client and a server, are intercepted. For example, proxy device 102 may intercept TCP connection parameters that client 108A is negotiating with server 104A during a handshake phase.

In block 403, optionally, the TCP connection parameters are modified before being forwarded. For example, proxy device 102 may modify TCP connection parameters that were proposed by client 108A, and then forward the modified TCP connection parameters, rather than the originally proposed TCP connection parameters, toward server 104A. Proxy device 102 may do this so that server 104A has the opportunity to accept only those of the originally proposed TCP connection parameters that proxy device 102 is capable of supporting.

In block 404, intercepted information is stored in a first connection block data structure. The intercepted information comprises one or more of the TCP connection parameters agreed upon by the client and server. A tuple that identifies the client also may be stored in the first connection block data structure; thus, the first connection block corresponds to the client. For example, proxy device 102 may store, in a first connection block data structure at proxy device 102, TCP connection parameters including the maximum segment size, the window scale factor, and flags that indicate whether time stamping and selective acknowledgment are to be used in the TCP connection. These particular TCP connection parameters are stored because they usually cannot be obtained from any packets communicated outside of the negotiation. TCP connection parameters that can be obtained from packets communicated outside of the negotiation do not need to be stored.

In block 406, intercepted information is stored in a second connection block data structure. The intercepted information comprises one or more of the TCP connection parameters agreed upon by the client and server. A tuple that identifies the server also may be stored in the first connection block data structure; thus, the second connection block corresponds to the server. For example, proxy device 102 may store, in a second connection block data structure at proxy device 102, the same kind of TCP connection parameters that proxy device 102 stored in the first connection block data structure.

In block 408, an association is established between the first and second connection block data structures. For example, proxy device 102 may establish this association at proxy device 102.

In block 410, one or more packets are received through the client-to-server connection. For example, proxy device 102 may receive one or more packets that client 108A sent toward server 104A through a TCP endpoint at client 108A. The contents of the payload portions of the packets collectively may comprise a request, such as an HTTP request.

In block 412, two TCP endpoints are created at the proxy device such that one full TCP connection is constructed between the client and the proxy device, and another full TCP connection is constructed between the proxy device and the server, thereby proxying the original client-to-server connection. The client-to-proxy device connection comprises (a) a new TCP endpoint at the proxy device and (b) the original TCP endpoint at the client. The proxy device-to-server connection comprises (a) a new TCP endpoint at the proxy device and (b) the original TCP endpoint at the server.

One of the new TCP endpoints at the proxy device is created based on (a) one or more TCP connection parameters contained in at least one of the packets received from the client and (b) the TCP connection parameters stored in the connection block data structure that corresponds to the client. For example, proxy device 102 may allocate and populate a TCB for the new TCP endpoint based on the maximum segment size, the window scale factor, and flags that proxy device 102 stored in the first connection block data structure in block 404. The TCB for the TCP endpoint also may be populated based on actual sequence numbers indicated in the packets received from client 108A.

Similarly, the other new TCP endpoint is created based on (a) one or more TCP connection parameters contained in at least one of the packets received from the client and (b) the TCP connection parameters stored in the connection block data structure that was associated, in block 408, with the first connection block data structure. Thus, the new TCP endpoints are constructed without the proxy device negotiating the TCP connection parameters with the client or server. After the new TCP endpoints have been created, control passes to block 414.

In block 414, for each packet that the proxy device has received, the proxy device sends a corresponding TCP ACK packet toward the packet's source. For example, for each packet that proxy device 102 received in block 410, proxy device 102 may send, through the new TCP endpoint that is at the proxy device's end of the new client-to-proxy device connection, a corresponding TCP ACK packet. As a result, client 108A does not need to receive TCP ACK packets from server 104A.

In block 416, optionally, contents of one or more of the payload portions of the packets received from the client are modified or dropped. For example, proxy device 102 may reorder and assemble the contents of multiple packets to form a message collectively contained therein (such as an HTTP request), determine whether any of the contents of the message match a specified pattern, and then perform specified actions (such as modifying or dropping the packets) in response to a determination that some of the contents match the specified pattern.

In block 418, packets that have not been dropped are sent through the new TCP endpoint that is at the proxy device's end of the new proxy device-to-server connection. For example, proxy device 102 may send, through the new TCP endpoint, the (possibly modified) packets that proxy device 102 received from client 108A. As a result, the packets are sent toward server 104A.

For each such packet, proxy device 102 may listen for a corresponding TCP ACK packet from server 104A. If a specified amount of time passes before proxy device 102 receives a TCP ACK packet for a particular packet, then proxy device 102 may re-send the particular packet to server 104A. Thus, proxy device 102 may ensure that any packets whose payload portions proxy device 102 modified are reliably transported.

4.0 Implementation Mechanisms—Hardware Overview

Figure 5:
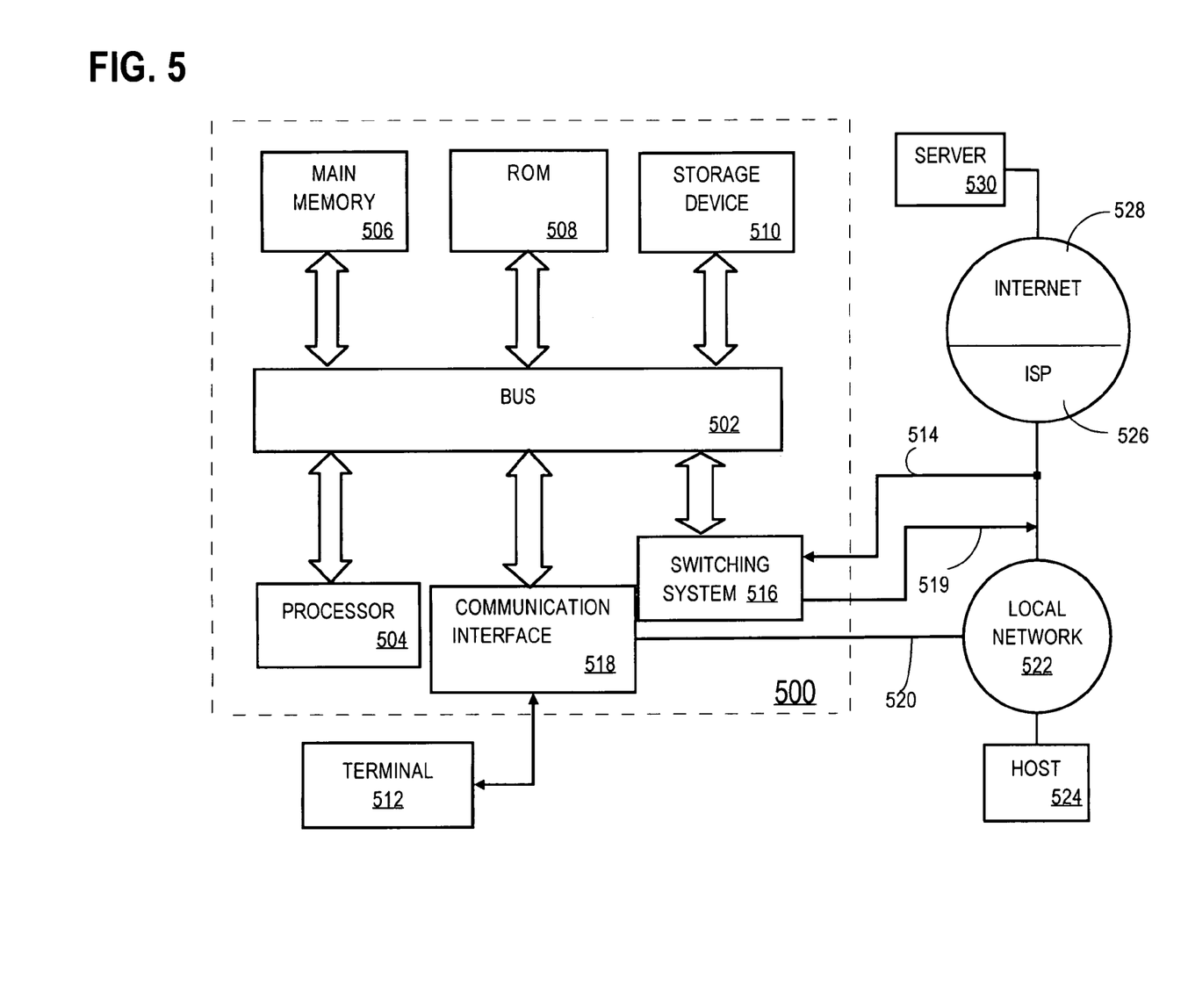
FIG. 5 is a block diagram that illustrates a computer system upon which an embodiment may be implemented.

FIG. 5 is a block diagram that illustrates a computer system 500 upon which an embodiment of the invention may be implemented. One embodiment is implemented using one or more computer programs running on a network element such as a proxy device. Thus, in this embodiment, the computer system 500 is a proxy device such as a firewall device.

Computer system 500 includes a bus 502 or other communication mechanism for communicating information, and a processor 504 coupled with bus 502 for processing information. Computer system 500 also includes a main memory 506, such as a random access memory (RAM), flash memory, or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk, flash memory or optical disk, is provided and coupled to bus 502 for storing information and instructions.

A communication interface 518 may be coupled to bus 502 for communicating information and command selections to processor 504. Interface 518 is a conventional serial interface such as an RS-232 or RS-322 interface. An external terminal 512 or other computer system connects to the computer system 500 and provides commands to it using the interface 514. Firmware or software running in the computer system 500 provides a terminal interface or character-based command interface so that external commands can be given to the computer system.

A switching system 516 is coupled to bus 502 and has an input interface 514 and an output interface 519 to one or more external network elements. The external network elements may include a local network 522 coupled to one or more hosts 524, or a global network such as Internet 528 having one or more servers 530. The switching system 516 switches information traffic arriving on input interface 514 to output interface 519 according to pre-determined protocols and conventions that are well known. For example, switching system 516, in cooperation with processor 504, can determine a destination of a packet of data arriving on input interface 514 and send it to the correct destination using output interface 519. The destinations may include host 524, server 530, other end stations, or other routing and switching devices in local network 522 or Internet 528.

The invention is related to the use of computer system 500 for proxying an established client-to-server connection on computer system 500. According to one embodiment of the invention, computer system 500 provides for such proxying in response to processor 504 executing one or more sequences of one or more instructions contained in main memory 506. Such instructions may be read into main memory 506 from another computer-readable Medium, such as storage device 510. Execution of the sequences of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infrared transmitter to convert the data to an infrared signal. An infrared detector coupled to bus 502 can receive the data carried in the infrared signal and place the data on bus 502. Bus 502 carries the data to main memory 506, from which processor 504 retrieves and executes the instructions. The instructions received by main memory 506 may optionally be stored on storage device 510 either before or after execution by processor 504.

Communication interface 518 also provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for proxying an established client-to-server connection as described herein.

Processor 504 may execute the received code as it is received and/or stored in storage device 510 or other non-volatile storage for later execution. In this manner, computer system 500 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

For example, although an embodiment described above refers to obtaining and storing TCP connection parameters that are indicated in a TCP SYN/ACK packet, in an alternative embodiment, such TCP connection parameters may be obtained from a TCP SYN packet.

What is claimed is:

1. A method of enabling an intermediary device to behave as a proxy device relative to two communicating entities after a connection already has been established between the two communicating entities, the method comprising the computer-implemented steps of:

receiving, at the intermediary device, a Transmission Control Protocol (TCP) SYN/ACK packet that indicates one or more TCP parameters that a second entity has accepted for use in an original TCP connection between the second entity and a first entity for which the TCP SYN/ACK packet is destined;

the intermediary device storing one or more of the TCP parameters in a connection block data structure, wherein the one or more TCP parameters include at least one of a) maximum segment size; b) window scale factor; c) a first flag that indicates whether time stamping will be used; or d) a second flag that indicates whether selective acknowledgement will be used;

the intermediary device sending the TCP SYN/ACK packet toward the first entity;

based on the one or more TCP parameters that are stored in the connection block data structure, the intermediary device creating a first TCP endpoint of a first TCP connection to the first entity; and based on the one or more TCP parameters that are stored in the connection block data structure, the intermediary device creating a second TCP endpoint of a second TCP connection to the second entity;

using the intermediary device, creating a proxied TCP connection between the first entity and the second entity without negotiating TCP parameters with the first entity or the second entity, wherein the proxied TCP connection comprises the first TCP endpoint and the second TCP endpoint;

in response to a data packet passing through the original connection, replacing the original connection with the proxied connection;

the intermediary device accumulating a plurality of packets received via one of the first or second TCP endpoints, sending a corresponding TCP ACK packet for each of the plurality of packets on behalf of one of the first entity or second entity, and before forwarding the plurality of packets, assembling portions of the plurality of packets to form a message and inspecting the message;

wherein the intermediary device comprises a computer system positioned between the two communicating entities.

2. A method as recited in claim 1, wherein the step of creating the first TCP endpoint comprises creating the first TCP endpoint based on one or more TCP parameters that are indicated in the data packet, wherein the data packet was sent by the first entity toward the second entity over the original TCP connection.

3. A method as recited in claim 2, wherein the data packet does not indicate the one or more TCP parameters that are stored in the connection block data structure.

4. A method as recited in claim 2, wherein the data packet is not a TCP SYN packet or a TCP SYN/ACK packet.

5. A method as recited in claim 1, wherein the step of creating the first TCP endpoint comprises creating the first TCP endpoint without negotiating TCP parameters with the first entity.

6. A method as recited in claim 1, wherein a maximum segment size is among the one or more TCP parameters that is indicated in the TCP SYN/ACK packet and stored in the connection block data structure.

7. A method as recited in claim 1, wherein a window scaling factor is among the one or more TCP parameters that is indicated in the TCP SYN/ACK packet and stored in the connection block data structure.

8. A method as recited in claim 1, the method further comprising:

receiving a data packet at the first TCP endpoint; and in response to receiving the data packet at the first TCP endpoint, sending the data packet through the second TCP endpoint.

9. A method as recited in claim 1, the method further comprising:

receiving a data packet at the first TCP endpoint;

modifying content that is contained in a payload portion of the data packet; and after modifying the content, sending the data packet through the second TCP endpoint.

10. A method as recited in claim 1, the method further comprising:
receiving a first data packet of the plurality of packets at the first TCP endpoint; and
in response to receiving the first data packet, sending a TCP ACK packet through the first TCP endpoint.

11. A method as recited in claim 10, the method further comprising:
receiving a second data packet of the plurality of packets at the first TCP endpoint;
forming the message by appending contents of at least a payload portion of the second data packet to contents of at least a payload portion of the first data packet;
determining whether any part of the message matches a specified pattern;
if any part of the message matches the specified pattern, then dropping the first data packet and the second data packet so that neither the first data packet nor the second data packet is received by the second entity; and
if no part of the message matches the specified pattern, then sending the first data packet and the second data packet through the second TCP endpoint.

12. A method as recited in claim 1, the method further comprising:
receiving an original TCP SYN packet that indicates one or more proposed TCP parameters that the first entity proposes for use in the original TCP connection, wherein the original TCP SYN packet is destined for the second entity;
altering the one or more proposed TCP parameters to produce an altered TCP SYN packet that indicates one or more altered TCP parameters; and
sending the altered TCP packet, instead of the original TCP SYN packet, toward the second entity.

13. A computer-readable volatile or non-volatile medium storing one or more sequences of instructions for enabling an intermediary device to behave as a proxy device relative to two communicating entities after a connection already has been established between the two communicating entities, which instructions, when executed by one or more processors, cause the one or more processors to carry out the steps of:
receiving, at the intermediary device, a Transmission Control Protocol (TCP) SYN/ACK packet that indicates one or more TCP parameters that a second entity has accepted for use in an original TCP connection between the second entity and a first entity for which the TCP SYN/ACK packet is destined;
the intermediary device storing one or more of the TCP parameters in a connection block data structure, wherein the one or more TCP parameters include at least one of a) maximum segment size; b) window scale factor; c) a first flag that indicates whether time stamping will be used; or d) a second flag that indicates whether selective acknowledgement will be used;
the intermediary device sending the TCP SYN/ACK packet toward the first entity;
based on the one or more TCP parameters that are stored in the connection block data structure, the intermediary device creating a first TCP endpoint of a TCP connection to the first entity; and
based on the one or more TCP parameters that are stored in the connection block data structure, the intermediary device creating a second TCP endpoint of a TCP connection to the second entity;
using the intermediary device, creating a proxied TCP connection between the first entity and the second entity without negotiating TCP parameters with the first entity or the second entity, wherein the proxied TCP connection comprises the first TCP endpoint and the second TCP endpoint;
in response to a data packet passing through the original connection, replacing the original connection with the proxied connection;
the intermediary device accumulating a plurality of packets received via one of the first or second TCP endpoints, sending a corresponding TCP ACK packet for each of the plurality of packets on behalf of one of the first entity or second entity, and before forwarding the plurality of packets, assembling portions of the plurality of packets to form a message and inspecting the message;
wherein the intermediary device comprises a computer system positioned between the two communicating entities.

14. An apparatus positioned between two communicating entities that behaves as a proxy device relative to the two communicating entities after a connection already has been established between the two communicating entities, comprising:
a network interface that is coupled to a data network for receiving one or more packet flows therefrom;
a processor;
one or more stored sequences of instructions which, when executed by the processor, cause the processor to carry out the steps of:
receiving, at the apparatus, a Transmission Control Protocol (TCP) SYN/ACK packet that indicates one or more TCP parameters that a second entity has accepted for use in an original TCP connection between the second entity and a first entity for which the TCP SYN/ACK packet is destined;
the apparatus storing one or more of the TCP parameters in a connection block data structure, wherein the one or more TCP parameters include at least one of a) maximum segment size; b) window scale factor; c) a first flag that indicates whether time stamping will be used; or d) a second flag that indicates whether selective acknowledgement will be used;
the apparatus sending the TCP SYN/ACK packet toward the first entity;
based on the one or more TCP parameters that are stored in the connection block data structure, the apparatus creating a first TCP endpoint of a first TCP connection to the first entity; and
based on the one or more TCP parameters that are stored in the connection block data structure, the apparatus creating a second TCP endpoint of a second TCP connection to the second entity;
using the apparatus, creating the proxied TCP connection between the first entity and the second entity without negotiating TCP parameters with the first entity or the second entity, wherein the proxied TCP connection comprises the first TCP endpoint and the second TCP endpoint;
in response to a data packet passing through the original connection, replacing the original connection with the proxied connection;
the apparatus accumulating a plurality of packets received via one of the first or second TCP endpoints, sending a corresponding TCP ACK packet for each of the plurality of packets on behalf of one of the first entity or second entity, and before forwarding the plurality of packets, assembling portions of the plurality of packets to form a message and inspecting the message.

15. The computer-readable volatile or non-volatile medium of claim 13, wherein the instructions, when executed by the one or more processors, cause the one or more processors to carry out the steps of:
receiving a data packet at the first TCP endpoint;
modifying content that is contained in a payload portion of the data packet; and
after modifying the content, sending the data packet through the second TCP endpoint.

16. The computer-readable volatile or non-volatile medium of claim 13, wherein the instructions, when executed by the one or more processors, cause the one or more processors to carry out the steps of:
receiving a first data packet of the plurality of packets at the first TCP endpoint; and
in response to receiving the first data packet, sending a TCP ACK packet through the first TCP endpoint;
receiving a second data packet of the plurality of packets at the first TCP endpoint;
forming the message by appending contents of at least a payload portion of the second data packet to contents of at least a payload portion of the first data packet;
determining whether any part of the message matches a specified pattern;
if any part of the message matches the specified pattern, then dropping the first data packet and the second data packet so that neither the first data packet nor the second data packet is received by the second entity; and
if no part of the message matches the specified pattern, then sending the first data packet and the second data packet through the second TCP endpoint.

17. The computer-readable volatile or non-volatile medium of claim 13, wherein the instructions, when executed by the one or more processors, cause the one or more processors to carry out the steps of:
receiving an original TCP SYN packet that indicates one or more proposed TCP parameters that the first entity proposes for use in the original TCP connection, wherein the original TCP SYN packet is destined for the second entity;
altering the one or more proposed TCP parameters to produce an altered TCP SYN packet that indicates one or more altered TCP parameters; and
sending the altered TCP packet, instead of the original TCP SYN packet, toward the second entity.

18. The apparatus of claim 14, wherein the instructions, when executed by the processor, further cause the processor to carry out the steps of:
receiving a data packet at the first TCP endpoint;
modifying content that is contained in a payload portion of the data packet; and
after modifying the content, sending the data packet through the second TCP endpoint.

19. The apparatus of claim 14, wherein the instructions, when executed by the processor, further cause the processor to carry out the steps of:
receiving a first data packet of the plurality of packets at the first TCP endpoint; and
in response to receiving the first data packet, sending a TCP ACK packet through the first TCP endpoint;
receiving a second data packet of the plurality of packets at the first TCP endpoint;
forming the message by appending contents of at least a payload portion of the second data packet to contents of at least a payload portion of the first data packet;
determining whether any part of the message matches a specified pattern;
if any part of the message matches the specified pattern, then dropping the first data packet and the second data packet so that neither the first data packet nor the second data packet is received by the second entity; and
if no part of the message matches the specified pattern, then sending the first data packet and the second data packet through the second TCP endpoint.

20. The apparatus of claim 14, wherein the instructions, when executed by the processor, further cause the processor to carry out the steps of:
receiving an original TCP SYN packet that indicates one or more proposed TCP parameters that the first entity proposes for use in the original TCP connection, wherein the original TCP SYN packet is destined for the second entity;
altering the one or more proposed TCP parameters to produce an altered TCP SYN packet that indicates one or more altered TCP parameters; and
sending the altered TCP packet, instead of the original TCP SYN packet, toward the second entity.

* * * * *